United States Patent [19]

Ezekoye

[11] Patent Number: 4,766,765
[45] Date of Patent: Aug. 30, 1988

[54] MULTIPHASE VALVE TESTING

[75] Inventor: L. Ike Ezekoye, Wilkinsburg, Pa.

[73] Assignee: Westinghouse Electric Corp., Pittsburgh, Pa.

[21] Appl. No.: 930,197

[22] Filed: Nov. 13, 1986

[51] Int. Cl.$^4$ .................... G01M 19/00; G01L 27/00
[52] U.S. Cl. ...................................... 73/168; 73/4 R; 374/143
[58] Field of Search ........................... 73/168, 4 R, 46; 374/143

[56] References Cited

U.S. PATENT DOCUMENTS

| 295,585 | 3/1884 | Richardson | 73/4 R |
|---|---|---|---|
| 909,950 | 1/1909 | Schreidt | 73/4 R |
| 3,164,979 | 1/1965 | Siegel | 73/4 R |
| 3,436,955 | 4/1969 | Wilcher | 73/4 R |
| 3,485,082 | 12/1969 | Myers | 73/4 R |
| 3,768,299 | 10/1973 | Garren | 73/4 R |
| 3,872,875 | 3/1975 | Raidl, Jr. | 73/4 R |
| 4,527,415 | 7/1985 | Chabat-Courrede | 73/4 R |
| 4,566,310 | 1/1986 | Cohen et al. | 73/168 |
| 4,646,556 | 3/1987 | Courcoux et al. | 73/4 R |
| 4,682,495 | 7/1987 | McNeely | 73/168 |
| 4,722,221 | 2/1988 | Ferguson | 73/168 |

FOREIGN PATENT DOCUMENTS 1153881 5/1969 United Kingdom .................. 73/168

Primary Examiner—William A. Cuchlinski, Jr.
Assistant Examiner—Thomas B. Will
Attorney, Agent, or Firm—M. G. Panian

[57] ABSTRACT

A portable test device for set point and leakage testing of a variety of sizes of pressure relief valves using the actual operating fluid under realistic test conditions includes a housing having a cylindrical bore, a main piston slidable in the bore to form at one end a test chamber, a translator piston also slidable in the bore to form at the other end a pressurizing chamber, and a spring pack biasing the pistons apart. An adapter plate mounts various size relief valves to the device with the valve inlet in communication with the test chamber. With a fixed amount of test fluid sealed in the test chamber, the pressure of hydraulic fluid introduced into the pressurizing chamber increases the pressure of the test fluid until the valve actuates. An electric immersion heater in the test chamber provides the capability for hot liquid testing and vapor testing. In the latter case, fluid in the liquid phase is introduced into the test chamber and heated to the test temperature by the immersion heater with the pressure held at a value just above, but close to, saturation pressure at the test temperature. The pressure is rapidly reduced to flash the fluid into the vapor phase and then built up again to the desired test conditions.

16 Claims, 3 Drawing Sheets

MULTIPHASE VALVE TESTING

BACKGROUND OF INVENTION

1. Field of the Invention

This invention relates to apparatus and a method for testing valves, and more particularly, for set point and seat leakage testing of pressure relief valves with selected fluids in selected phases.

2. Background Information

Set point testing of relief valves is required by the American Society of Mechanical Engineers (Sections III, VIII) to assure that vessels, boilers and pipelines are not overpressurized. To accomplish this, two schemes are generally used, viz:

(1) one approach is to remove the valve to be tested from the protected equipment and test it in a shop with water, nitrogen or steam, as available. Nitrogen is commonly used because it is generally available.

(2) another technique is to leave the relief valve in place on the protected equipment and to install on top of the valve an assist device, typically pneumatic or hydraulic powered, that will aid the valve to open. By monitoring system conditions in the output of the assist device, it is possible to back calculate the set point of the relief valve.

While the above schemes are generally acceptable, there is always a desire among maintenance and operations people, to test relief valves for set point and leakage in the actual medium and conditions in which they are used to confirm their operational readiness. For example, set point testing of relief valves used in steam service with nitrogen is permissible, but there is no reliable correlation that converts the test results in one medium to another. Similarly, the use of power assist devices introduces some uncertainty in data reduction in terms of the interaction of the displacements of many interacting valve parts on the estimated set point. Since the set point is back calculated when power assist devices are used, the accuracy of the final result depends upon the precision of the recorded variables. Thus, while the present test schemes are acceptable, they can still be improved upon.

SUMMARY OF THE INVENTION

In accordance with the invention, a relief valve is tested using a test device which includes a housing defining an internal chamber which is divided into a test chamber and a pressurizing chamber by piston means. Preferably, the piston means includes a main piston which forms an end wall of the test chamber, a translator piston which forms an end wall of the pressurizing chamber, and a spring pack in the form of a helical compression spring between the two pistons. The relief valve to be tested is bolted to an adapter plate having a hole pattern adapted to receive various sizes of relief valves with the inlet of the relief valve in communication with the test chamber. A selected test medium is introduced into the test chamber and relief valve through an inlet pipe while air is vented through a diametrically displaced vent pipe. Once the test chamber and relief valve are filled with the selected test medium, an inlet valve in the inlet line and a vent valve in the vent line are closed, and pressurizing fluid is introduced into the pressurizing chamber. Movement of the translator piston in response to the introduction of pressurizing fluid into the pressurizing chamber compresses the spring pack to load the main piston. The pressure in the test chamber is increased by increasing the pressure in the pressurizing chamber until the relief valve actuates. The set point of the relief valve is checked against the pressure in the test chamber at which the valve actuates as indicated by a pressure guage, preferably connected in the vent line.

If a hot liquid test is desired, an electric immersion heater in the test chamber heats the fluid medium to the desired temperature. If vapor testing is desired, the temperature of the test fluid in the liquid state is increased with system pressure set lower than the desired test pressure, at a pressure just above, but close to, the pressure required to maintain the test fluid in the liquid state at the desired test temperature. Once the desired temperature is reached, system pressure is rapidly reduced causing the liquid to flash into vapor. Preferably, this rapid reduction in pressure is achieved through a rapid increase in the volume of the test chamber induced by a reduction in the pressure of the pressurizing fluid. Following flashing of the test fluid to the vapor state, the pressure is quickly built up to the desired test pressure by again increasing the pressure of the pressurizing fluid. When the pressure has stabilized it is then slowly increased further until the relief valve actuates.

The apparatus and method of the invention offer many advantages in the testing of relief valves. With the invention, a relief valve may be tested using different fluids in one set up. Testing can be conducted at various fluid temperatures and in their gaseous or liquid phase. Discharge of test fluid is minimized so that toxic fluids can be safely handled and vented. The device is portable and can be used to test more than one size valve using the same fixture. Furthermore, no correlation factors are required. The actual data can be recorded as representative of valve behavior.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
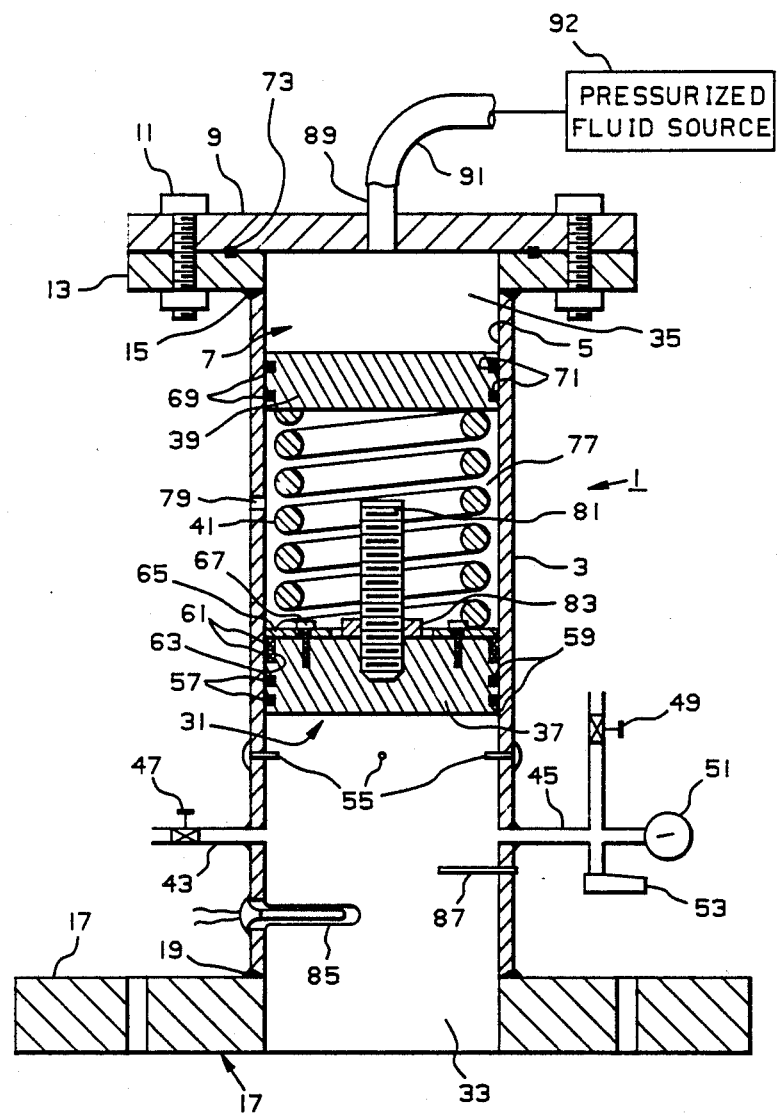
FIG. 1 is a longitudinal section through the relief valve test device according to the invention.
Figure 2:
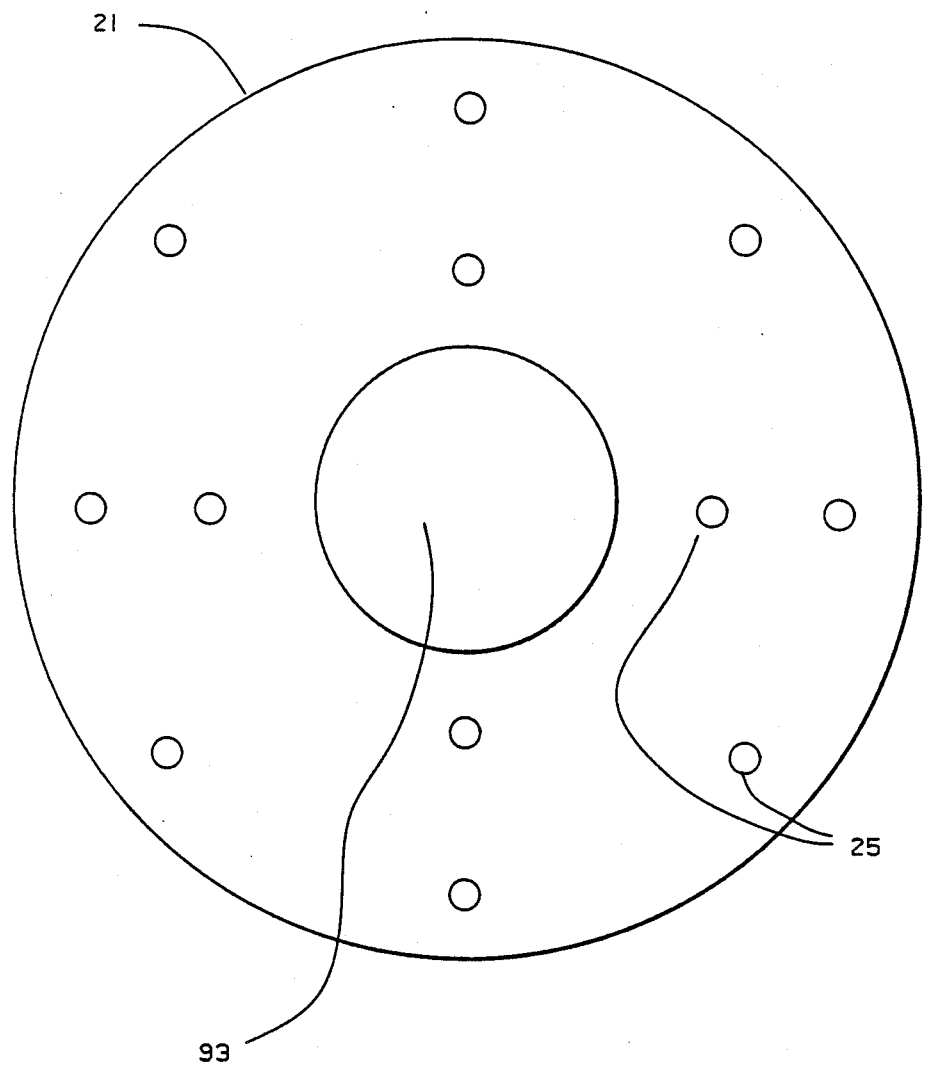
FIG. 2 is a plan view of the an adapter plate by which relief valves of varying sizes may be secured to the device of FIG. 1.
Figure 3:
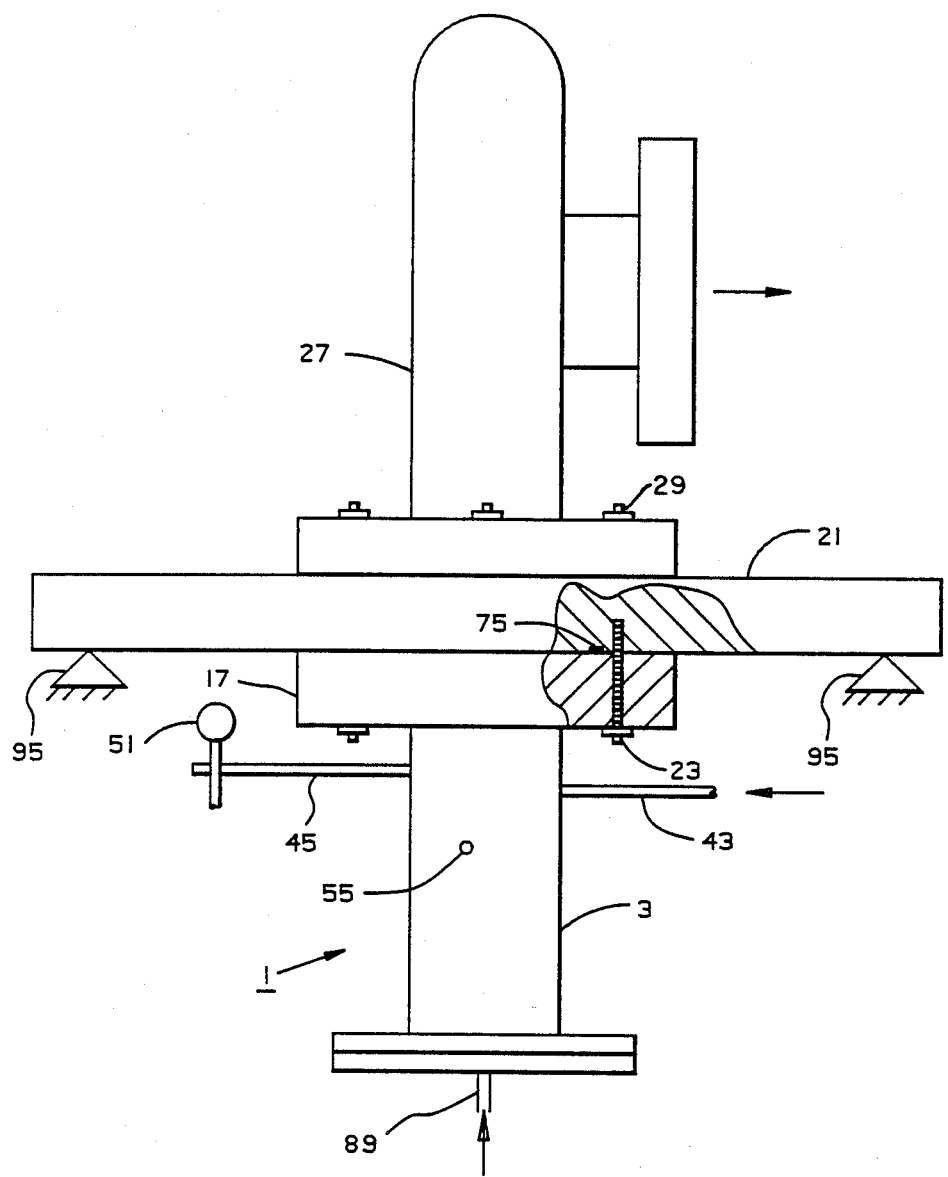
FIG. 3 is an elevation view of the test device of FIG. 1 with a relief valve secured thereto for testing.

As shown in the Figures the valve testing device 1 of the invention comprises a cylindrical housing 3 having a longitudinal bore 5 which defines an elongated chamber 7. The elongated chamber 7 is closed at one end by an endplate 9 secured by nuts and bolts 11 to flange 13 welded at 15 to the housing 3. Another flange 17 is welded at 19 to the other end of the housing 3, and an adapter plate 21 is secured to this flange by studs and nuts 23 (see FIG. 3). As illustrated in FIG. 2, the adapter plate 21 is provided with bolt holes 25 arranged in a pattern which accepts various sizes of relief valves. As shown in FIG. 3, a relief valve 27 is bolted by bolts 29 to the adapter plate 21 for testing.

A piston assembly 31 slidable in the bore 5 of the housing divides the elongated chamber 7 into a test chamber 33 and a pressurizing chamber 35. This piston assembly 31 includes a main piston 37 forming an end wall of the test chamber 33 and a translator piston 39 which forms one end wall of the pressurizing chamber 35. Between the main piston 37 and translator piston 39 is a spring pack 41 comprising a helical compression spring.

An inlet pipe 43 and vent pipe 45 penetrate the wall of housing 3 at diametrically opposed locations for feeding and venting, respectively, the test chamber 33. An inlet valve 47 and vent valve 49 selectively block off the inlet pipe 43 and vent pipe 45 respectively. Connected to the vent pipe 45 are pressure measuring accessories in the form of pressure guage 51 for direct reading of the test chamber pressure and pressure transducer 53 for transmitting pressure signals to a pressure control device (not shown). Four equiangularly spaced travel stop buttons 55 (only three shown) extending inward through the wall of the housing 3 limit the travel of the piston assembly 31 in the direction of the test chamber 33 so that the inlet and vent pipes are not blocked by the piston.

Primary leak tightness for the main piston is provided by the pair of "O" ring seals 57 seated in annular grooves 59 in the piston. A secondary or back-up seal is provided by a pair of packing rings 61 seated in a groove 63 and held in place by a packing flange 65 and packing bolts 67. The translator piston 39 is sealed by "O" ring seals 69 seated in grooves 71. The end plate 9 is sealed against flange 13 by gasket 73. Similarly, the adapter plate 21 is sealed against flange 17 by gasket 75. The space 77 between pistons 37 and 39 is vented by orifice 79 through which any leakage from the test chamber 33 or pressurizing chamber 35 is removed. A rod 81 threaded into the main piston 37 and held in place by a lock nut 83, provides a controlled travel limit on the displacement of the translator piston 39 so that excessive displacement which would initiate the collapse of the spring pack 41 will not occur. Additionally, this rod 81 serves as a guide for spring pack 41.

An electric immersion heater 85 extends through the housing 3 into the test chamber 33 for heating the test medium for certain tests as discussed below. Thermocouples 87 are also provided in the test chamber for measuring the temperature of the test medium.

A nipple 89 is centrally located in endplate 9 for connecting a hose 91 for admitting and venting a pressurizing fluid supplied by a pressurized fluid source 92 into the pressurizing chamber 35 to provide the motive force to pressurize test fluid in the test chamber 33.

A relief valve 27 to be tested is bolted to the adapter plate 21 as shown in FIG. 3 with the inlet of the valve in communication with the test chamber 33 through a central bore 93 in the adapter plate. The test device can be supported with the relief valve in any orientation desired such as by the supports 95 in FIG. 3. The desired test fluid is admitted into the test chamber 33 and relief valve 27 through inlet pipe 43 by opening inlet valve 47. Any air in test chamber 33 is vented out through vent pipe 45 by opening vent valve 49. The test device 1 may be rotated to assure that all the air is removed. Once the test chamber 33 is filled with test fluid, the inlet pipe 43 and vent pipe 45 are blocked by closing valves 47 and 49 respectively. A high pressure fluid (such as air, water or oil) is introduced into pressurizing chamber 35 and bears against the translator piston 39 causing it to move. The motion of the translator piston 39 compresses the spring pack 41 which in turn loads the main piston. The main piston compresses the test fluid trapped in test chamber 33. By increasing the pressure of the pressurizing fluid, the pressure of the test fluid is increased until the relief valve set point pressure is reached and the valve pops. By monitoring the pressure on the pressure guage 51 the accuracy of the set point setting can be tested.

If the temperature of the test medium is to be increased (for example, a hot liquid test is desired), the heaters 85 are turned on and the temperature of the test fluid is controlled by means of thermocouple 87 output. Thermal pressurization is minimized by the fact that the spring pack 41 compresses as pressure in the test chamber 33 increases, thus reducing the likelihood of a thermally induced pressure build up in the chamber. Testing proceeds by increasing the pressure of the hydraulic fluid in pressurizing chamber 35 until the valve test pressure is reached and the valve 27 pops. If the temperature is increased to the point where the rod 81 seats against the translator piston 39, further increase in the pressure in the test chamber 33 can be precluded by utilizing a constant pressure pressurized fluid source 92 for supplying fluid to the pressurizing chamber 35. In fact, the translator piston 39 could alternatively be fixed to the main piston 37 such as by a rod 81 secured to both pistons. In this case, a constant pressure source of pressurized fluid should be used to minimize pressure build up in the test chamber during hot testing.

If testing in a vapor state is desired, the temperature of the fluid in the liquid state is increased with system pressure set lower than the desired test pressure, at a pressure just above, but close to, the pressure required to maintain the test fluid in the liquid state at the desired test temperature. For example, if the test is to be run on steam at 2,500 psi and 650 degrees F., the test fluid pressure is set at 2,300 psi which has a saturation temperature of 655.89 degrees F. Heat is applied to the test fluid until the desired temperature of 650 degrees F. is reached. Once this temperature is reached, the test pressure is suddenly reduced (for example, from 2,300 psi to 1,000 psi) causing the test fluid to flash into a vapor state. The test pressure is suddenly reduced by increasing the volume of the test chamber 33 through movement of the piston assembly 31 in response to a sudden reduction in the pressure of the pressurizing fluid supplied to the pressurizing chamber 35. Following the flashing of the test fluid, the test pressure is quickly built up to the test condition (i.e. 2,500 psi) by increasing the pressure of the hydraulic fluid supplied to chamber 35. Once the desired pressure is reached, it is allowed to stabilize in accordance with the desired test instructions. Since condensation form a vapor state to a liquid state condition is a slow thermodynamic process, the test medium will remain in a vapor state for a considerable time allowing sufficient time for testing to be conducted. By gradually increasing the pressure, the valve will pop at its set point in the desired test medium.

Pressures and temperatures are monitored by means of the thermocouples 87 and pressure transducers 53. The adapter plate 21 in addition to providing means to adapt the device 1 to various relief valve 27 also provides a means to mount and move the assembled device such that it can be positioned in a most convenient way for the test.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for testing a pressure relief valve comprising:
    a housing defining an internal chamber;
    piston means slidable in said internal chamber and dividing said chamber into a test chamber and a pressurizing chamber;
    means for attaching the relief valve to be tested to the housing with the relief valve in communication with the test chamber;
    inlet means for selectively introducing into and sealing within the test chamber and relief valve a fixed amount of a selected test fluid;
    means for measuring the pressure of the test fluid in the test chamber;
    means for heating the selected test fluid within the test chamber; and
    pressurizing means for introducing a pressurizing fluid into said pressurizing chamber to increase the pressure of said test fluid through movement of said piston means until said relief valve actuates, whereby the pressure measuring means provides an indication of the pressure at which the relief valve actuated with the selected test fluid.

2. The apparatus of claim 1 included vent means for venting air from the test chamber and relief valve as said selected test fluid is introduced into the test chamber.

3. The apparatus of claim 1 wherein said attaching means comprises an attachment plate on the end of said housing having means for attaching relief valves of varying size to the housing.

4. The apparatus of claim 1 wherein the piston means includes a main piston which defines with said housing said test chamber, a translator piston which defines with said housing said pressurizing chamber, and means connecting said translator to said main piston to translate the force generated by the pressurizing fluid on said translator piston to the test fluid through said main piston.

5. The apparatus of claim 4 wherein said means for translating the force generated by the pressurizing fluid to the test fluid comprises biasing means which biases the pistons apart.

6. The apparatus of claim 1 including temperature sensing means for sensing the temperature in the test chamber.

7. The apparatus of claim 5 wherein said biasing means comprises a helical compression spring.

8. The apparatus of claim 4 wherein said housing defines a vent opening for venting the space between the main piston and translator piston.

9. The apparatus of claim 1 including means for limiting the travel of the piston means toward the relief valve.

10. The apparatus of claim 9 including vent means for venting the test chamber and wherein said inlet means and said vent means penetrate the walls of the housing at a point beyond the limit of travel of the piston means as determined by the travel limiting means.

11. Apparatus for testing a pressure relief valve comprising:
    a housing defining an internal chamber;
    a main piston slidable in said internal chamber in the housing and forming at one end thereof a test chamber;
    a translator piston slidable in said internal chamber in the housing and forming at the other end thereof a pressurizing chamber;
    spring pack means between said main piston and said translator piston for biasing said pistons apart;
    means for attaching the relief valve to be tested to the housing with the relief valve in communication with the test chamber;
    inlet means for selectively introducing into, and sealing within the test chamber and relief valve, a fixed amount of a selected test fluid;
    vent means for selectively venting the test chamber and relief valve;
    means for measuring the pressure of the test fluid in the test chamber; and
    pressurizing means for introducing a pressurizing fluid into said pressurizing chamber to increase the pressure of said test fluid through the movement of said translator piston and main piston until said relief valve actuates.

12. The apparatus of claim 11 including heating means for heating the selected test fluid within the test chamber, and temperature sensing means for sensing the temperature in the test chamber.

13. A method of testing the set point of a relief valve with an operating fluid in the supersaturated vapor phase, comprising the steps of:
    attaching to the relief valve a test device with a test chamber defined in part by a piston in communication with the inlet of the test relief valve;
    introducing the operation fluid into the test chamber and relief valve inlet in the liquid phase;
    heating the liquid test fluid to the desired temperature for the test while maintaining the pressure below the desired test pressure, but at a pressure just above, but close to, the pressure required to maintain the fluid in a liquid phase at the desired test temperature;
    when the fluid reaches the desired test temperature, rapidly reducing the pressure on the test fluid while maintaining the mass of the fluid constant to cause said test fluid to flash into the vapor phase; and
    quickly raising the pressure of the vapor to the desired value for testing the set point of the relief valve with the test fluid in the vapor phase.

14. The method of claim 13 wherein said step of rapidly decreasing the pressure of said test fluid to cause the test fluid to flash into the vapor phase, comprises rapidly increasing the volume of said test chamber, and wherein the step of quickly raising the pressure of the vapor comprises quickly decreasing the volume of said test chamber.

15. The method of claim 14 wherein the step of rapidly increasing the volume of the test chamber comprises moving the piston which slides within a housing to define the test chamber in a first direction, and wherein the step of quickly decreasing the volume of the test chamber comprises moving the piston in the opposite direction.

16. A method of testing a pressure relief valve under actual operating conditions, comprising the steps of:
    attaching the relief valve to a test device defining a test chamber and a pressurizing chamber separated by a moveable piston wherein each chamber is of equal pressure, with the inlet of the relief valve in communication with said test chamber;

sealing a fixed amount of a selected test fluid in the test chamber and inlet of the relief valve;

introducing a pressurized fluid into the pressurizing chamber to move the piston to increase the pressure of the test fluid in the test chamber and relief valve until the relief valve actuates; and measuring the pressure of the test fluid in the test chamber and relief valve at which the relief valve actuates.

* * * * *